(12) United States Patent
Bahar

(10) Patent No.: US 9,909,224 B2
(45) Date of Patent: Mar. 6, 2018

(54) ELECTROCHEMICAL COMPRESSOR WITH REACTANT CONDUIT

(71) Applicant: Xergy Inc., Georgetown, DE (US)

(72) Inventor: Bamdad Bahar, Georgetown, DE (US)

(73) Assignee: Xergy LTD (GB)

( * ) Notice: Subject to any disclaimer, the term of this patent is extended or adjusted under 35 U.S.C. 154(b) by 0 days.

(21) Appl. No.: 15/369,791

(22) Filed: Dec. 5, 2016

(65) Prior Publication Data

US 2017/0082328 A1 Mar. 23, 2017

Related U.S. Application Data

(63) Continuation-in-part of application No. 15/289,220, filed on Oct. 10, 2016, which is a continuation of application No. 13/029,006, filed on Feb. 16, 2011, now Pat. No. 9,464,822, which is a continuation-in-part of application No. 12/771,620, filed on Apr. 30, 2010, now Pat. No. 8,627,671, application No. 15/369,791, which is a continuation-in-part of application No. 14/859,267, (Continued)

(51) Int. Cl.
| | |
|---|---|
| *F25B 27/00* | (2006.01) |
| *C25B 9/06* | (2006.01) |
| *F25B 1/00* | (2006.01) |
| *C09K 5/16* | (2006.01) |
| *C25B 1/04* | (2006.01) |
| *C09K 5/04* | (2006.01) |
| *F25B 1/10* | (2006.01) |

(52) U.S. Cl.
CPC ............... *C25B 9/06* (2013.01); *C09K 5/041* (2013.01); *C09K 5/16* (2013.01); *C25B 1/04* (2013.01); *F25B 1/00* (2013.01); *F25B 1/10* (2013.01); *F25B 2400/07* (2013.01); *F25B 2400/075* (2013.01); *Y02E 60/366* (2013.01)

(58) Field of Classification Search
CPC .... C25B 9/06; C25B 1/04; C09K 5/16; F25B 1/00; F25B 1/10; F25B 2400/07; F25B 2400/075; Y02E 60/366; Y02E 60/364
See application file for complete search history.

(56) References Cited

U.S. PATENT DOCUMENTS

| | | | | |
|---|---|---|---|---|
| 6,553,771 | B2* | 4/2003 | Tsenter | F04B 35/00 62/46.2 |
| 2008/0145735 | A1* | 6/2008 | Ishikawa | H01M 8/04089 429/508 |
| 2009/0159454 | A1* | 6/2009 | Machado | C23C 16/4488 205/335 |

* cited by examiner

*Primary Examiner* — Elizabeth Martin
(74) *Attorney, Agent, or Firm* — Invention To Patent Services; Alex Hobson

(57) ABSTRACT

An electrochemical compressor incorporates an electrochemical cell having an anode and a cathode that reacts a working on the anode side into an ionic component and a reactant. The ionic component is transported through an ion conducting media to the cathode. At least a portion of the reactant passes through a reactant conduit that extends from the anode to the cathode. A transfer device, such as a pump or venturi valve configured along the reactant conduit allows the reactant to flow from the anode to the cathode. The reactant and the ionic component are reacted on the cathode to reform the working fluid. A reactant separator may be configured to selectively allow reactant into the reactant conduit. A reactant separator may be a perm-selective layer or a fluid that has high reactant solubility. The working fluid may be water with the ionic component protons and the reactant oxygen.

19 Claims, 8 Drawing Sheets

Related U.S. Application Data filed on Sep. 19, 2015, now Pat. No. 9,599,364, which is a continuation-in-part of application No. 13/899,909, filed on May 22, 2013, now abandoned.

(60) Provisional application No. 62/262,845, filed on Dec. 3, 2015, provisional application No. 61/215,131, filed on May 1, 2009, provisional application No. 61/305,410, filed on Feb. 17, 2010, provisional application No. 61/347,428, filed on May 23, 2010.

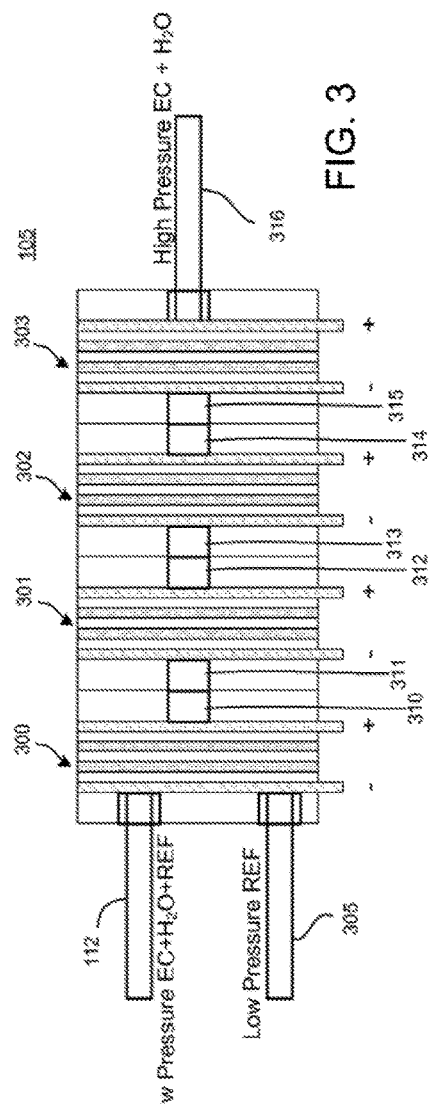
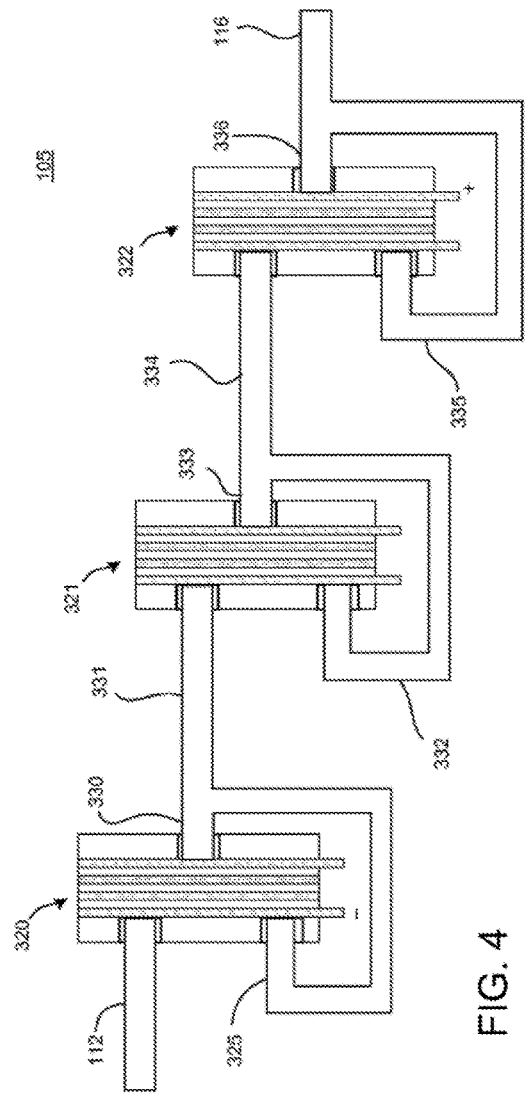
FIG. 3
FIG. 4

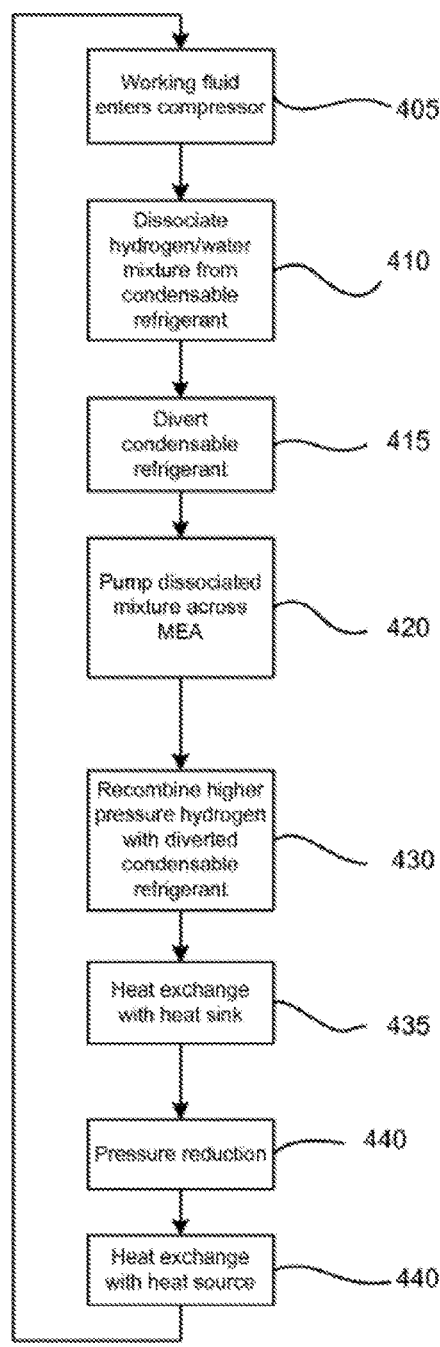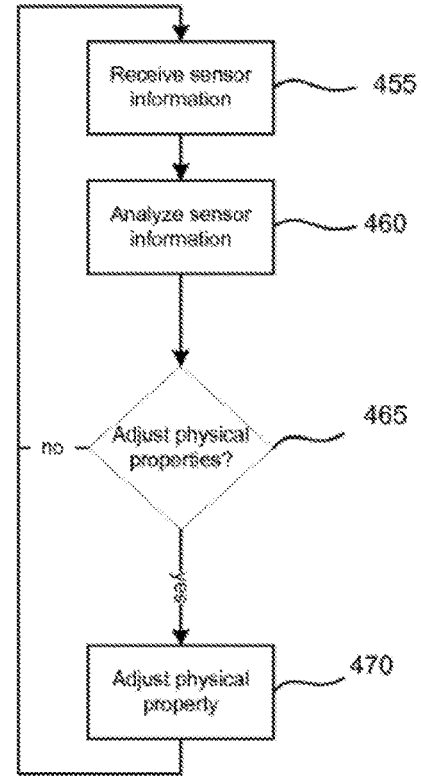
FIG. 6
FIG. 7

ELECTROCHEMICAL COMPRESSOR WITH REACTANT CONDUIT

CROSS REFERENCE TO RELATED APPLICATIONS

This application is a continuation of U.S. application Ser. No. 15/289,220 filed on Oct. 10, 2016, entitled Electrochemical Heat Transfer System and currently pending, which is a continuation of U.S. application Ser. No. 13/029,006 filed on Feb. 16, 2011, entitled "Electrochemical Heat Transfer System" and issued as U.S. Pat. No. 9,464,822 on Oct. 11, 2016, which is a continuation-in-part of U.S. application Ser. No. 12/771,620 filed on Apr. 30, 2010, entitled "Self-Contained Electrochemical Heat Transfer System" and issued as U.S. Pat. No. 8,627,671 on Jan. 14, 2014, which claims the benefit of U.S. provisional patent application No. 61/215,131 filed on May 1, 2009, and U.S. application Ser. No. 13/029,006 claims priority to U.S. provisional application No. 61/305,410 filed on Feb. 17, 2010 and entitled "Electrochemical Heat Pump System for Cooling Electronic Components," and to U.S. provisional application No. 61/347,428, filed May 23, 2010 and entitled "Compact Cooling Systems Using Electrochemical Compression," this application also claims the benefit of priority to U.S. provisional application No. 62/262,845, filed on Dec. 3, 2015, and entitled "Electrochemical Compressor and Refrigeration System Using Same"; and this application is a continuation in part of U.S. patent application Ser. No. 14/859,267 filed on Sep. 19, 2015 and entitled "Electrochemical Compressor Based Heating Element and Hybrid Hot Water Heater Employing Same", which is a continuation in part of U.S. patent application Ser. No. 13/899,909 filed on May 22, 2013, entitled "Electrochemical Compressor Based Heating Element And Hybrid Hot Water Heater Employing Same" which is now abandoned this application also claims the benefit of priority to U.S. provisional application No. 62/262,845, filed on Dec. 3, 2015, entitled "Electrochemical Compressor and Refrigeration System Using Same"; the entirety of all related applications are hereby incorporated by reference herein.

BACKGROUND OF THE INVENTION

Field of the Invention

The present invention relates to an electrochemical compressor that initiates the decomposition of a working fluid into an ionic component that is passed through and electrolyte or ion conducting layer and a reactant component that is transferred through a reactant conduit to react with the ionic component passed through the electrolyte to reform the working component, and in particular to an electrochemical compressor used in a refrigerant cycle.

Background

A major drawback of current electrochemical compressors is the need to engage hydrogen gas to generate protons to drive polar species such as water across a membrane electrode assembly. Hydrogen does not change phases in the system and as a result creates complexities in the heat exchangers and expansion valve and lowers overall system efficiency.

SUMMARY OF THE INVENTION

An exemplary electrochemical compressor incorporates an electrochemical cell having an anode and a cathode that reacts a working on the anode side into an ionic component and a reactant. The ionic component is transported through an ion conducting media to the cathode. At least a portion of the reactant passes through a reactant conduit that extends from the anode to the cathode. A transfer device, such as a pump or venturi valve configured along the reactant conduit allows the reactant to flow from the anode to the cathode. The reactant and the ionic component are reacted on the cathode to reform the working fluid. A reactant separator may be configured to selectively allow reactant into the reactant conduit. A reactant separator may be a permselective layer or a fluid that has high reactant solubility. The working fluid may be water with the ionic component protons and the reactant oxygen.

In an exemplary embodiment, the present invention provides an electrochemical compressor that does not require hydrogen as a component in the working fluid. An exemplary electrochemical compressor of the present invention disassociates or proactively decomposes a working fluid into an ionic component and a reactant. For example, water may be decomposed into protons and oxygen through an electrically driven electrolysis process in the presence of a catalyst. The protons are transferred through an electrolyte, such as an ionomer, and the oxygen is transferred through a reactant conduit having a device to move the reactant component from the low pressure side of the electrochemical cell, or anode in this case, to the higher pressure side of the electrochemical cell, or the cathode, where they react with the transferred protons to reform the working fluid, or water.

A transfer device to move the reactant from the low pressure side to the higher pressure side of the electrochemical call may be a one-way flow valve, a venturi nozzle, turbine, fan, pump or any other device that enables the transfer of the second component from the anode side of the electrochemical compressor to the cathode side of the compressor. The nozzle has a head, or tip, that is of the appropriate diameter where the velocity and pressure of the gas exiting is higher than the static pressure of the gas on the cathode side. This allows a gas from the low pressure side, cathode side, to be passed through to the higher pressure side, anode side. This is accomplished through the venturi nozzle that increases the velocity of the gas passing therethrough.

Any ionic compound that can be decomposed into an ionic component and reactant component may be utilized in the electrochemical compressor system as described herein including, but not limited to, water, methanol, and ammonium for example. In an exemplary embodiment, the working fluid comprises water that is disassociated on the on the anode side into oxygen and protons. The protons pass through the ion conducting membrane, such as an ionomer, to the cathode. The protons drag water through the ion conducting membrane to the cathode side and thereby creates a higher pressure on the cathode side. The oxygen created by the electrolysis of water on the anode side is pumped through the venturi nozzle to the cathode side, where it reacts with the protons to reform water. In this embodiment, hydrogen is not required to be pumped around the system, or through the refrigeration cycle where it reduces efficiency and adds complexity as it does not change phases under these conditions.

In an alternative embodiment, methanol is the working fluid and it disassociated on the anode to produce protons that transfer through the ion transport membrane from the anode to the cathode. Carbon dioxide may be fed from the anode to the cathode through the venturi nozzle for reformation of the methanol.

The electrochemical compressor may be utilized in a refrigeration system. In one general aspect, a refrigeration system conveys heat from a first heat reservoir at, a relatively low temperature to a second heat reservoir at relatively high temperature. The refrigeration system defines a closed loop that contains a working fluid, at least part of the working fluid being circulated through the closed loop. The refrigeration system includes a first heat transfer device that transfers heat from the first heat reservoir to the working fluid, a second heat transfer device that transfers heat from the working fluid to the second heat reservoir, an expansion valve between the first and second heat transfer devices that reduces pressure of the working fluid, and an electrochemical compressor between the first and second heat transfer devices. An exemplary electrochemical compressor includes one or more electrochemical cells electrically connected to each other through a power supply, each electrochemical cell including a gas pervious anode, a gas pervious cathode, and an electrolytic membrane disposed between and in intimate electrical contact with the cathode and the anode.

Implementations can include one or more of the following features. For example, the working fluid can include a condensable refrigerant that bypasses the electrochemical process; and an electrochemically active fluid that participates in the electrochemical process of decomposition and reformation across electrochemical compressor.

In other implementations, the working fluid may consist of a condensable refrigerant only wherein the compounds that are decomposed on the low pressure side of the electrochemical compressor are reformed on the high pressure side of the electrochemical compressor. A working fluid may be water, for example. In other implementations, the working fluid includes a separate condensable refrigerant that is not water and an electrochemically active fluid. In some implementations, the condensable refrigerant does not participate in the electrochemical process. The working fluid can include carbon dioxide. The working fluid can include a fluorocarbon gas. The electrolytic membrane can include a solid electrolyte, for example, a gel.

The refrigeration system can include a temperature sensor thermally coupled to one or more of the working fluid, the first heat transfer device, and the second heat transfer device. The first heat transfer device can include a condenser. The second heat transfer device can include an evaporator.

The electrochemical compressor can include a cathode gas space on a nonelectrolyte side of the cathode; and an anode gas space on a nonelectrolyte side of the anode. The electrochemical compressor can include a first electrochemically active route that traverses the anode and cathode; a second non-electrochemical route that bypasses the anode and cathode; and a combiner that combines the components that have traversed the first and second routes. The electrochemical compressor includes a reactant conduit for transferring a reactant component from the anode to the cathode.

The refrigeration system can also include a mechanical compressor. The mechanical compressor can be in series with the electrochemical compressor. The mechanical compressor can be between the electrochemical compressor and the first heat transfer device. The mechanical compressor can be between the electrochemical compressor and second heat transfer device.

In another general aspect, an electrochemical compressor includes an inlet fluidly coupled to an evaporator to receive a working fluid that comprises a condensable refrigerant and an electrochemically active fluid; an outlet fluidly coupled to a condenser; and one or more electrochemical cells electrically connected to each other through a power supply. Each electrochemical cell includes a gas pervious anode, a gas pervious cathode, and an electrolytic membrane disposed between and in intimate electrical contact with the cathode and the anode. The anode, the cathode, and the electrolytic membrane are configured to pass the electrochemically active fluid. The electrochemical cell is configured to disassociate the condensable refrigerant from the electrochemically active fluid to prevent the condensable refrigerant from passing through the anode, the cathode, and the electrolytic membrane. The electrolytic membrane includes a membrane having a porous microstructure and an ion exchange material impregnated throughout the membrane.

Implementations can include one or more of the following features. For example, the ion conducting media or layer may have a Gurley number of greater than 1,000 seconds, therein defining a layer having no bulk air permeability. An ion conducting layer may be an ionomer, or a composite wherein a support material is configured with the ionomer, or an ionomer membrane, such as Gore-Select, available from W.L. Gore and Associated, Newark, Del. An exemplary ion conducting layer or ionomer membrane may be able to withstand a pressure gradient between a side adjacent the anode and a side adjacent the cathode, such as at least 10 psi or more, at least 20 psi or more, at least 30 psi or more and any range between and including the pressure gradient values provided.

The ion conducting layer or ionomer membrane can include a synthetic fluoropolymer of tetrafluoroethylene. The synthetic fluoropolymer can be an expanded polytetrafluoroethylene having a porous microstructure of polymeric fibrils. The ion exchange material can substantially impregnate the membrane so as to render an interior volume of the membrane substantially occlusive. The ion exchange material can be impermeable to gas. The ion exchange material can be permeable to gas. The ion exchange material can be selected from a group consisting of perfluorinated sulfonic acid resin, perfluorinated carboxylic acid resin, polyvinyl alcohol, divinyl benzene, styrene-based polymers, and metal salts with or without a polymer.

An exemplary electrochemical compressor may comprise one or more electrochemical cell coupled together in parallel, or in series. A first electrochemically active route can be defined by the anode, the electrolytic membrane, and the cathode; and a second non-electrochemical route bypasses the anode, the electrolytic membrane, and the cathode. The compressor can include a combiner that combines the components of the working fluid that have traversed the first, route, the second route, or both the first and second routes.

The ion exchange material can include a liquid electrolyte embedded in a matrix. The ion exchange material can include an anionic exchange membrane and the anode gas space operates at a higher pressure than the cathode gas space. The porous membrane can have a total thickness of less than 0.025 mm.

In another general aspect, a method of refrigeration includes conveying heat from a first heat reservoir at a relatively low temperature to a second heat reservoir at relatively high temperature by circulating a working fluid through a closed loop that is thermally coupled to the first heat reservoir at a first portion and is thermally coupled to the second heat reservoir at a second portion. Conveying includes transferring heat from the working fluid at the second loop portion to the second heat reservoir including liquefying at least some of the working fluid; reducing a pressure of the at least partially liquefied working fluid by expanding the working fluid at a substantially constant enthalpy; and transferring heat from the first heat reservoir to the working fluid at the first loop portion including vaporizing at least some of the working fluid. Conveying also includes increasing a pressure of the working fluid by dissociating a working fluid from a condensable refrigerant into an ionic component and a reactant component. Conveying include transferring the ionic component of the working fluid through an electrolyte and the reactant component through a reactant conduit where it is passes through a device that transfers the reactant component from the low pressure side to the high pressure side of the electrochemical compressor. The reactant and ionic components recombine on the high pressure side to reform the working fluid.

The method can also include controlling the amount of heat conveyed by varying one or more of a current and a voltage applied to pump the charged particles to create the electric potential gradient across the electrolytic membrane.

There are several benefits to using carbon dioxide as a refrigerant in a refrigeration system. If carbon dioxide manages to leak out of the system, and make its way up to the ozone layer, the ultraviolet radiation does not break up the molecule to release highly active chlorine radicals that help to deplete the ozone layer. Therefore, carbon dioxide does not deplete the ozone layer.

Moreover, while many have noted a few problems associated with the use o carbon dioxide in refrigeration systems, for example, requiring operating at higher pressure and higher compressor temperature, these operating requirements are found to be more advantageous in automotive applications. The very high cycle pressure results in a high fluid density throughout the cycle, allowing miniaturization of the systems for the same heat pumping power requirements. Furthermore, the high outlet temperature of the compressor can permit faster defrosting of automobile windshields and can even be used for combined space heating and hot water heating in home usage. In fuel cell applications involving the production of hydrogen from hydrocarbon sources such as natural gas, hydrogen gas is fed to the electrode assembly as a mixed gas stream with carbon dioxide present (typically referred to as reformate). Thus, electrodes have been developed and are commercially available (such as W. L. Gore & Associates Inc. series 56 PRIMEA assembly) with suitable electrochemical performance with mixed hydrogen and carbon dioxide gas streams.

The vapor compression refrigeration system uses an electrochemical compressor and therefore is modular (that is, it can be of different sizes without limitation). The vapor compression refrigeration system is electrically driven and thus fully electronically controlled. The vapor compression refrigeration system can be considered essentially noiseless, and thus is less noisy than conventional mechanical refrigeration systems. The vapor compression refrigeration system is more efficient than conventional mechanical refrigeration systems The summary of the invention is provided as a general introduction to some of the embodiments of the invention, and is not intended to be limiting. Additional example embodiments including variations and alternative configurations invention are provided herein.

BRIEF DESCRIPTION OF THE DRAWINGS

The accompanying drawings are included to provide a further understanding of the invention and are incorporated in and constitute a part of his specification, illustrate embodiments of the invention, and together with the description serve to explain the principles of the invention.

FIGS. 3-5 are block diagrams of electrochemical compressors that include a plurality of electrochemical cells and can be used in the refrigeration system of FIG. 1.

FIG. 6 is a flow chart of a procedure performed by the refrigeration system of FIG. 1.

FIG. 7 is a flow chart of a procedure performed by a control system within the refrigeration system of FIG. 1.

DETAILED DESCRIPTION OF THE ILLUSTRATED EMBODIMENT

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 1:
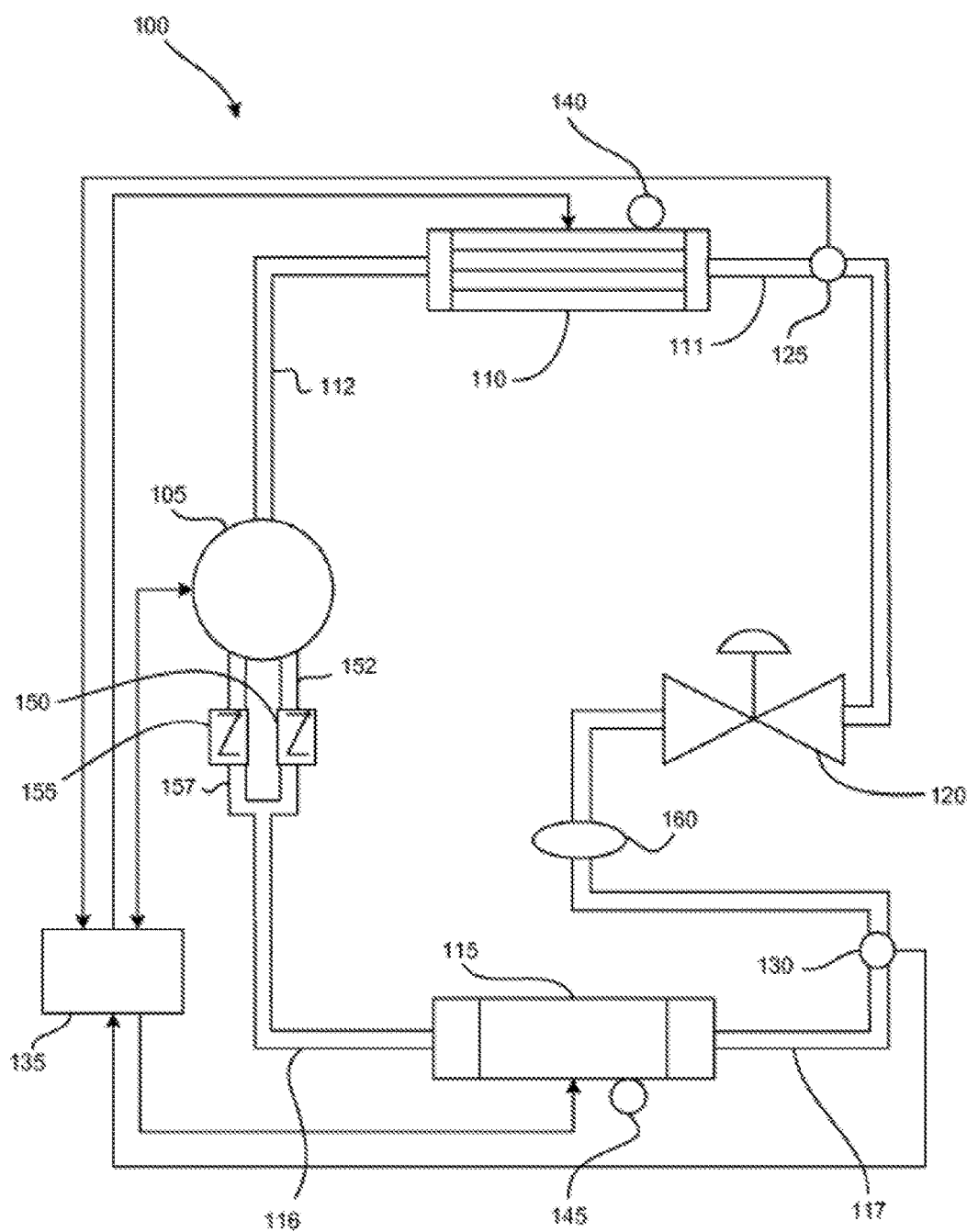
FIG. 1 is block diagram of an exemplary refrigeration system that defines a closed loop that contains a working fluid and includes an electrochemical compressor.

Referring to FIG. 1, an exemplary refrigeration system 100 defines a closed loop that contains a working fluid. The system 100 includes an electrochemical compressor 105 that lacks moving parts, a first heat transfer device 110 that transfers heat from a first heat reservoir, a heat source or object to be cooled, to the working fluid, a second heat transfer device 115 that transfers heat from the working fluid to a second heat reservoir, a heat sink, and a thermostatic expansion valve 120 between the first and second heat transfer devices. The system 100 also includes one or more sensors, for example, temperature sensors, 125, 130 placed along flow paths between components of the system 100 to provide feedback to a control system 135 that is also coupled to the compressor 105, the first heat transfer device 110, and the second heat transfer device 115.

The working fluid contained within the closed loop of the system 100 includes at least a first component that is electrochemically active and therefore takes part in the electrochemical process within the compressor 105. The working fluid includes at least a second component that is a condensable refrigerant that can be used for the heat pump application under consideration. The condensable refrigerant is any suitable condensable composition that does not include water. As discussed below, the condensable refrigerant bypasses the electrochemical process within the compressor 105.

Additionally, the working fluid includes a third component that is water to hydrate an ion exchange membrane within the compressor 105. Water can be considered a contaminant of some standard refrigerants, and it can negatively impact heat exchange performance of the refrigerant. Thus, water as the third component of the working fluid can be reduced for example, to a minimal amount that is needed to provide enough hydration to one or more components of the compressor 105.

In some implementations, the first component, which is electrochemically active, includes hydrogen ($H_2$) and the second component, which is a condensable refrigerant and includes carbon dioxide ($CO_2$). In this implementation, the components are present in the proportion of approximately one part hydrogen and four parts of carbon dioxide by volume. The relative proportions of hydrogen and carbon dioxide are governed by the desired relative efficiency of the electrochemical compressor 105 and the system 100. The quantity of water maintained in the working fluid is governed by the thickness of membranes employed in the compressor 105, the equivalent weight, acidity, of the ion exchange media employed in the compressor 105, and the amount of hydrogen in the system 100. Thinner membranes of higher equivalent weight, that is, lower acidity, employed in systems with lower proton capability require less water. In general, the working fluid includes less than 50% of water, but can include less than 20%, less than 10%, or less than 1% water, depending on the application.

It should be noted that while hydrogen is being used primarily as the electrochemically active component of the working fluid, hydrogen also possesses useful heat transfer properties. Hydrogen's low density, high specific heat, and thermal conductivity make it a superior coolant. Hydrogen gas can be used as the heat transfer medium industrially in, for example, turbine generators. The presence of hydrogen gas within the working fluid thus enhances the performance of the condensable refrigerant; and provides thermal exchange opportunities at points away from thermally conductive surfaces of the fluid conduits and the heat transfer devices.

The first heat transfer device 110 includes an evaporator that acts as a heat exchanger that places the working fluid in a heat exchange relationship with the first heat reservoir or source of heat, for example, a source fluid. The first heat transfer device 110 includes inlet and outlet ports coupled to respective conduits 111, 112 that contain the working fluid of the system 100. The second, heat transfer device 115 includes a condenser that acts as a heat exchanger that places the working fluid in a heat exchange relationship with the second heat reservoir or heat sink, for example, a sink fluid. The second heat transfer device 115 includes inlet and outlet ports coupled to respective conduits 116, 117 that contain the working fluid of the system 100. The expansion valve 120 is an orifice that is able controls the amount of working fluid flow. The valve 120 can include a temperature sensing bulb filled with a similar gas as in the working fluid that causes the valve to open against the spring pressure in the valve body as the temperature on the bulb increases. As temperatures in the evaporator 110 decrease, so does the pressure in the bulb and therefore on the spring causing the valve to close.

Figure 2:
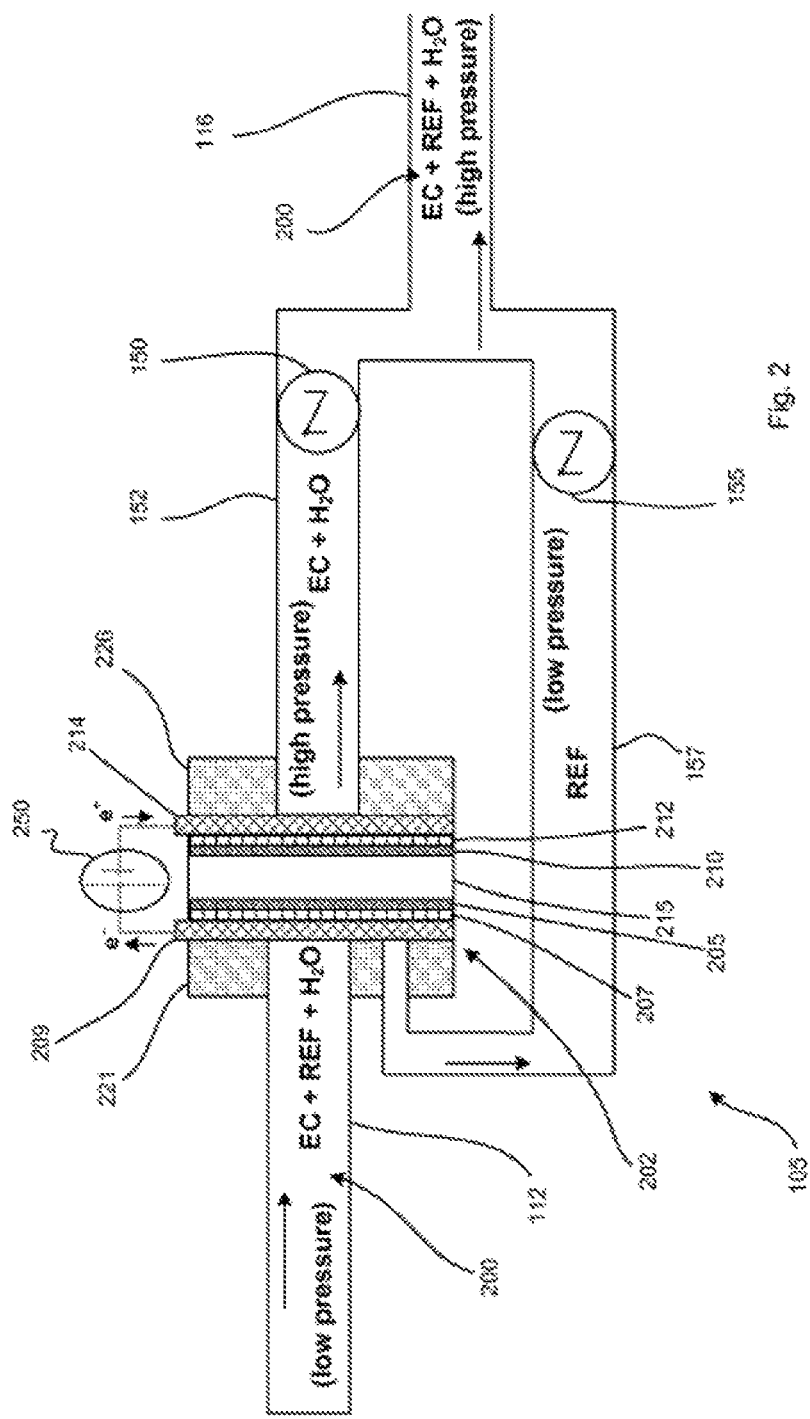
FIG. 2 is block diagram of an electrochemical compressor and components of a working fluid that can be used in the refrigeration system of FIG. 1.

Referring also to FIG. 2, the electrochemical compressor 105 is a device that raises the pressure of a component of the working fluid 200 by an electrochemical process. Accordingly, at least one component of the working fluid must be electrochemically active. In particular, the electrochemically active component (the first component) must be ionizable. For example, the electrochemically active component is oxidizable at a gas pervious anode 205 of the compressor 105 and is reducible at a gas pervious cathode 210 of the compressor 105.

Each cell 202 includes the anode 205, where the electrochemically active component, EC, of the working fluid is oxidized; the cathode 210, where the electrochemically active component EC of the working fluid is reduced; and an electrolyte 215 that serves to conduct the ionic species, $EC_+$, from the anode 205 to the cathode 210. The electrolyte 215 can be an impermeable solid ion exchange membrane having a porous microstructure and an ion exchange material impregnated through the membrane such that the electrolyte 215 can withstand an appreciable pressure gradient between its anode and cathode sides. The examples provided here employ impermeable ion exchange membranes, and the electrochemically active component of the working fluid is remixed with the working fluid after compression and thus the pressure of the working fluid 200 is elevated prior to the condensation phase of the refrigeration process. However, a permeable ion exchange membrane is also feasible with the working fluid traversing in a unidirectional and sequential path through electrode assemblies with increasing pressure. The active components of the working fluid dissolve into the ion exchange media of the ion exchange membrane and the gas in the working fluid traverses through the ion exchange membrane.

As another example, the electrolyte 215 can be made of a solid electrolyte, for example, a gel, that is, any solid, jelly-like material that can have properties ranging from soft and weak to hard and tough and being defined as a substantially dilute crosslinked system that exhibits no flow when in the steady-state. The solid electrolyte can be made very thin, for example, it can have a thickness of less than 0.2 mm, to provide additional strength to the gel. Alternatively, the solid electrolyte can have a thickness of less than 0.2 mm if it is reinforced with one or more reinforcing layers like a polytetrafluoroethylene (PTFE) membrane having a thickness of about 0.04 mm or less depending on the application and the ion exchange media of the electrolyte.

Each of the anode 205 and the cathode 210 can be an electrocatayst such as platinum or palladium or any other suitable candidate catalyst. The electrolyte 215 can be a solid polymer electrolyte such as Nafion manufactured by the I. E. DuPont DeNemours Company, or Gore Select, manufactured by W. L. Gore & Associates Inc. The catalysts, that is, the anode 205 and the cathode 210 are intimately bonded to each side of the electrolyte 215. The anode 205 includes an anode gas space, a gas diffusion media 207 and the cathode 210 includes a cathode gas space, a gas diffusion media 212. The electrodes, the anode 205 and the cathode 210, of the cell 202 can be considered as the electrocatalytic structure that is bonded to the solid electrolyte 215. The combination of the electrolyte 215, which can be an ion exchange membrane, and the electrodes, the anode 205 and the cathode 210, is referred to as a membrane electrode assembly or MEA.

Adjacent the anode gas space 207 is an anode current collector 209 and adjacent the cathode gas space 212 is a cathode current collector 214. The anode collector 209 and the cathode collector 214 are electrically driven by the power supply 250. The anode collector 209 and the cathode collector 214 are porous, electronically conductive structures that can be woven metal screens, also available from Tech Etch, or woven carbon cloth or pressed carbon fiber or variations thereof. The pores in the current collectors 209, 214 serve to facilitate the flow of gases within the gas spaces 207, 212 adjacent to the respective electrodes 205, 210.

Outer surfaces of the collectors 209, 214 are connected to respective bipolar plates 221, 226 that provide fluid barriers that retain the gases within the cell 202. Additionally, if the cell 202 is provided in a stack of cells, then the bipolar plates 221, 226 separate the anode and cathode gases within each of the adjacent cells in the cell stack from each other and facilitate the conduction of electricity from one cell to the next cell in the cell stack of the compressor. The bipolar plate 221, 226 can be obtained from a number of suppliers including Tech Etch, MA.

Additionally, subassemblies of components of the electrochemical cell can be commercially obtained from manufacturers such as W. L. Gore & Associates Inc. under the PRIMEA trademark or Ion Power Inc. Commercially available assemblies are designed for oxygen reduction on one electrode and therefore the electrodes, the anode 205 and cathode 210, may need to be modified for hydrogen reduction.

Hydrogen reduction at the cathode 210 actually requires lower loadings of precious metal catalysts and also is feasible with alternative lower cost catalysts such as palladium. Thus, the eventual production costs of assemblies employed in the system 100 are substantially lower than typical fuel cell components.

As mentioned above, the control system 135 is coupled to the compressor 105, the first heat transfer device 110, and the second heat transfer device 115. The control system 135 is also coupled to one or more temperature sensors 125, 130, 140, 145 placed within the system 100 to monitor or measure the temperature of various features of the system 100. For example, the temperature sensor 125 can be configured to measure the temperature of the working fluid within the conduit 111 and the temperature sensor 130 can be configured to measure the temperature of the working fluid within the conduit 117. As another example, temperature sensors 140, 145 can be placed near respective heat transfer devices 110, 115 to measure the temperature at which the heat transfer device operates, to measure the temperature of the working fluid within the respective heat transfer device, or to measure the heat source fluid temperature or heat sink fluid temperature.

The control system 135 can be a general system including sub-components that perform distinct steps. For example, the control system 135 includes the power supply 250, such as, for example, a battery, a rectifier, or other electric source, that supplies a direct current electric power to the compressor 105.

Moreover, the control system 135 can include one or more of digital electronic circuitry, computer hardware, firmware, and software. The control system 135 can also include appropriate input and output devices, a computer processor, and a computer program product tangibly embodied in a machine-readable storage device for execution by a programmable processor. The procedure embodying these techniques may be performed by a programmable processor executing a program of instructions to perform desired functions by operating on input data and generating appropriate output. Generally, a processor receives instructions and data from a read-only memory and/or a random-access memory. Storage devices suitable for tangibly embodying computer program instructions and data include all forms of non-volatile memory, including, by way of example, semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

The controller 135 receives information from components, such as the temperature sensors and the compressor 105, of the system 100 and controls operation of a procedure that can either maintain the heat source or the heat sink at a relatively constant temperature condition. Additionally, controlling the operation of an electrochemical compressor 105 consists of turning its current on or off through the power supply. Alternatively, the voltage applied to the electrochemical compressor 105 can be set to be in proportion to the heat source fluid temperature or the heat sink fluid temperature. In some applications, such as electric cars without internal combustion engines, there may be an advantage in operating the vehicle air conditioning system electrically and driving each wheel independently without a central motor required to drive the air conditioning system.

The refrigeration system 100 can also include one-way valves 150, 155 at the output of the compressor 105. The one-way valve 150, 155 can be any mechanical device, such as a check valve, that normally allows fluid, liquid or gas, to flow through it in only one direction, the direction of the arrows. The valves 150, 155 ensure proper delivery of the components of the working fluid that exit the compressor 105 into the rest of the refrigeration system 100 by reducing or avoiding back-pressure into the last cell in the compressor 105, and therefore ensure unidirectional flow of the fluids, which include gases. For example, the valve 150 is placed within a conduit 152 that transports the high pressure electrochemically active component plus the small amount of water that is involved in the electrochemical process and the valve 155 is placed within a conduit 157 that transports the condensable refrigerant that bypasses the electrochemical process.

The refrigeration system 100 can also include a dryer 160 that is configured to remove water from the working fluid prior to reaching the expansion valve 120 to reduce the chance of water freezing within the valve 120 and potentially clogging the valve 120, and to increase the efficiency of the expansion process within the valve 120.

Referring also to FIG. 3, in another implementation, the electrochemical compressor 105 includes a plurality of cells 300, 301, 302, 303 arranged in series with each other, with the first cell 300 receiving the low pressure working fluid 200 from the conduit 112 and diverting the low pressure refrigerant along conduit 305. In this implementation, only the first cell 300 diverts the low pressure refrigerant along the conduit 305. An output 310 from the first cell 300 is a higher pressure mixture of the electrochemically active component and water; the output 310 is fed into an input 311 of the second cell 301. Likewise, an output 312 from the second cell 301 is fed into an input 313 of the third cell 302, and an output 314 of the third cell 302 is fed into an input 315 of the fourth cell 303. An output 316 from the fourth cell 303 carries the high pressure mixture of the electrochemically active component and water, and this output is mixed with the diverted refrigerant in conduit 305, as discussed above, and directed along conduit 116 toward the second heat transfer device 115.

As shown in FIG. 3, the power supply is connected to the anode and cathode collector of each of the cells 300, 301, 302, 303. In other implementations, the anode collector of the cell 300 and the cathode collector of the cell 303 are the only collectors connected to the power supply. In this case, the end plates of each cell receive all the current and the current is then "conveyed" across the cells.

Referring to FIG. 4, in another implementation, the electrochemical compressor 105 includes a plurality of cells 320, 321, 322 arranged in series with each other, with the first cell 320 receiving the low pressure working fluid 200 from the conduit 112 and diverting the low pressure refrigerant along conduit 325. In this implementation, the low pressure refrigerant is mixed with the higher pressure mixture of the electrochemically active component and water directed through an output after each of the cells 320, 321, 322 and each of the cells 320, 321, 322 diverts the low pressure refrigerant. Thus, output 330 from the first cell 320 is a higher pressure mixture of the electrochemically active component and water and this mixture is mixed with the diverted low pressure refrigerant traveling in the conduit 325 to form a mixture of the higher pressure electrochemically active component, the water, and the refrigerant that is directed to an input 331 of the second cell 321. An output 333 from the second cell 321 is a higher pressure mixture of the electrochemically active component and water and this mixture is mixed with the diverted low pressure refrigerant traveling in conduit 332 to form a mixture of the higher pressure electrochemically active component, the water, and the refrigerant that is directed to an input 334 of the third cell 322. Lastly, an output 336 from the third cell 322 is a higher pressure mixture of the electrochemically active component and water and this mixture is mixed with the diverted low pressure refrigerant traveling in conduit 335 to form a mixture of the higher pressure electrochemically active component, the water, and the refrigerant that is directed along conduit 116 toward the second heat transfer device 115.

As shown in FIG. 4, the power supply is connected to the anode collector of the first cell 320 and to the cathode collector of the third cell 322. In this case, the end plates of each cell receive all the current and the current is then "conveyed" across the cells. In other implementations, the anode collector and cathode collector of each of the cells 320, 321, 322 are connected to the power supply.

Figure 5:
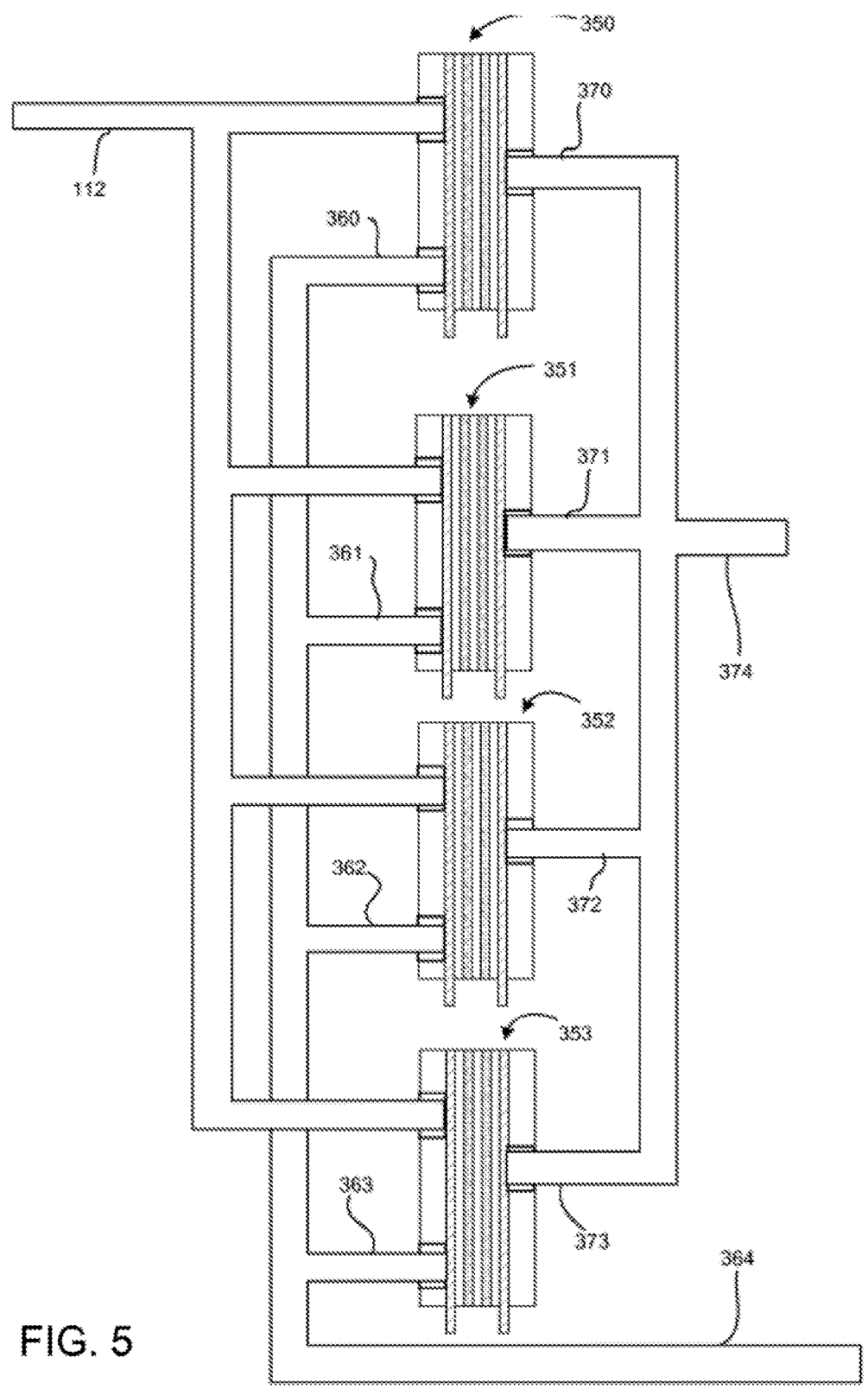

Referring to FIG. 5, in another implementation, the electrochemical compressor 105 includes a plurality of cells 350, 351, 352, 353 arranged in parallel with each other, with each of the cells 350, 351, 352, 353 receiving the low pressure working fluid 200 from the conduit 112 and each of the cells 350, 351, 352, 353 diverting the low pressure refrigerant along respective conduits 360, 361, 362, 363. In this implementation, the low pressure refrigerant from each of the cells 350, 351, 352, 353 is mixed together and passed through conduit 364, and the high pressure mixture of the electrochemically active component and water directed through respective outputs 370, 371, 372, 373 of each of the cells 350, 351, 352, 353 is mixed together and passed through conduit 374. These two mixtures in the conduits 364 and 374 are combined with each other and directed along the conduit 116 toward the second heat transfer device 115.

The power supply can be connected to the anode, collector and to the cathode connector of each of the cells 350, 351, 352, 353.

While three or four cells are shown in these drawings, it is noted that any number of cells can be used in the compressor 105, and the number of cells can be selected depending on the cooling application of the system 100.

Referring also to FIG. 6, the system 100 performs a procedure 400 for transferring heat from the heat source at the first heat transfer device 110 to the heat sink at the second heat transfer device 115.

Low pressure working fluid 200, which is typically a gas mixture of hydrogen, condensable refrigerant, and water, enters compressor 105, step 405. A mixture of hydrogen and water is dissociated from the condensable refrigerant, step 410. In particular, the hydrogen, in the form of a proton, and water dissolve into the ion exchange media while the condensable refrigerant does not. The condensable refrigerant is diverted along a path separate from the electrochemical path through the membrane electrode assembly, step 415. The dissociated mixture is then pumped across the membrane electrode assembly of each cell in the compressor 105, step 420. In particular, electrons are stripped from the hydrogen in the hydrogen/water mixture at the anode collector of the cell, and the hydrogen ions are transported across the anode, electrolyte, and toward the cathode due to the electrical potential applied across the collectors from the power supply. Additionally, the hydrogen ion gas is pressurized across the membrane electrode assembly. Next, the hydrogen ions are recombined with the electrons at the cathode collector to reform hydrogen gas at a higher pressure, and this higher pressure hydrogen gas is recombined with the diverted condensable refrigerant to thereby raise the pressure of the working fluid, step 430.

Thus, the electrochemical compressor 105 raises the pressure of the working fluid 200 and delivers the higher pressure working fluid 200 to the second heat transfer device, the condenser 115, where the condensable refrigerant is precipitated by heat exchange with the sink fluid, step 435. The working fluid is then reduced in pressure in the expansion valve 120, step 440. Subsequently, the low pressure working fluid is delivered to the first heat transfer device, the evaporator, 110 where the condensed phase of the working fluid is boiled by heat exchange with the source fluid, step 445. The evaporator effluent working fluid may be partially in the gas phase and partially in the liquid phase when it is returned from the evaporator to the electrochemical compressor 105. In the process, heat energy is transported from the evaporator to the condenser and consequently, from the heat source at a relatively lower temperature to the heat sink at relatively higher temperature.

Referring also to FIG. 7, concurrently with the procedure 400, the control system 135 performs a procedure 450 for controlling the amount of electrical potential applies to the current collectors of the compressor 105, and therefore also controls the amount of heat energy transported from the evaporator to the condenser. The control system 135 receives information from the one or more sensors, for example, temperature or pressure sensors, in the system 100 indicating physical characteristics, such as temperature or pressure, at key locations of the system 100, step 455. The control system 135 analyzes the information, step 460, and determines whether physical properties of the system 100 need to be adjusted based on the analyzed information, step 465. For example, the control system 135 can determine that a current applied to the compressor 105, and therefore the current applied to the electrode collectors, needs to be adjusted. As another example, the control system 135 can determine that a flow rate of one or more of the heat sink fluid and the heat source fluid that transport heat from and to the devices 115, 110 needs to be adjusted. If the control system 135 determines that a physical property of the system 100 should be adjusted, then the control system 135 sends a signal to the component that is affected to adjust the particular property, step 470. For example, the control system 135 can send a signal to the power supply to adjust the amount of current applied to the current collectors in the compressor 105. Otherwise, the control system 135 continues to receive information from the one or more sensors, step 455.

In summary, the system 100 includes an electrochemical cell of the compressor 105 that compresses an electrochemically active component of the working fluid, and remixes the compressed, at high pressure, electrochemically active component, the first component, with the condensable refrigerant, the second component, to elevate the pressure of the mixed gas working fluid in a vapor compression refrigeration cycle. In this way, the electrochemical compressor 105 is capable of producing high pressure hydrogen gas from a mixed component working fluid having an electrochemically active component such as, hydrogen and at least one condensable refrigerant. In this arrangement, hydrogen is compressed to a much higher pressure than the final working fluid pressure, that is, the pressure of the remixed working fluid, and because of this, the hydrogen when mixed with the lower pressure condensable refrigerant is at the required higher pressure. The exact pressure requirements for the hydrogen stream depends on the volume of condensable refrigerant being pressurized in relation to the volume of hydrogen, the desired final pressure requirements of the remixed working fluid, and the targeted energy efficiency. The check valves 150, 155 are employed to make sure the gas flows are maintained in the intended directions and that no backflow flow is allowed towards the cells of the compressor 105.

The energy efficiency of the system 100 depends on the available surface area of the anode 205 and the cathode 210, and the current density and operating voltage applied to the cells from the power supply. Higher current densities result in greater the resistive losses for the system 100.

The size reduction of the compressor 105 is feasible because of its cellular design, and because it is operating using an electrochemical process. If an application requires significant size reductions, the electrode, the anode and the cathode, surfaces can be reduced, the applied current densities and voltages can be increased, and as a result a smaller mass of cells can be employed in the compressor 105. This would result in an almost order of magnitude reduction in size and weight for the system 100 compared to conventional mechanical systems.

Since cooling capacity is linked to applied current and voltage, one advantage of this system is that it can more easily modulate from low capacity, that is, low current density at a specific voltage, to a high capacity. A system 100 designed to operate at high capacities actually becomes more efficient at lower utilizations, while, the opposite is true for mechanical systems.

Figure 8:
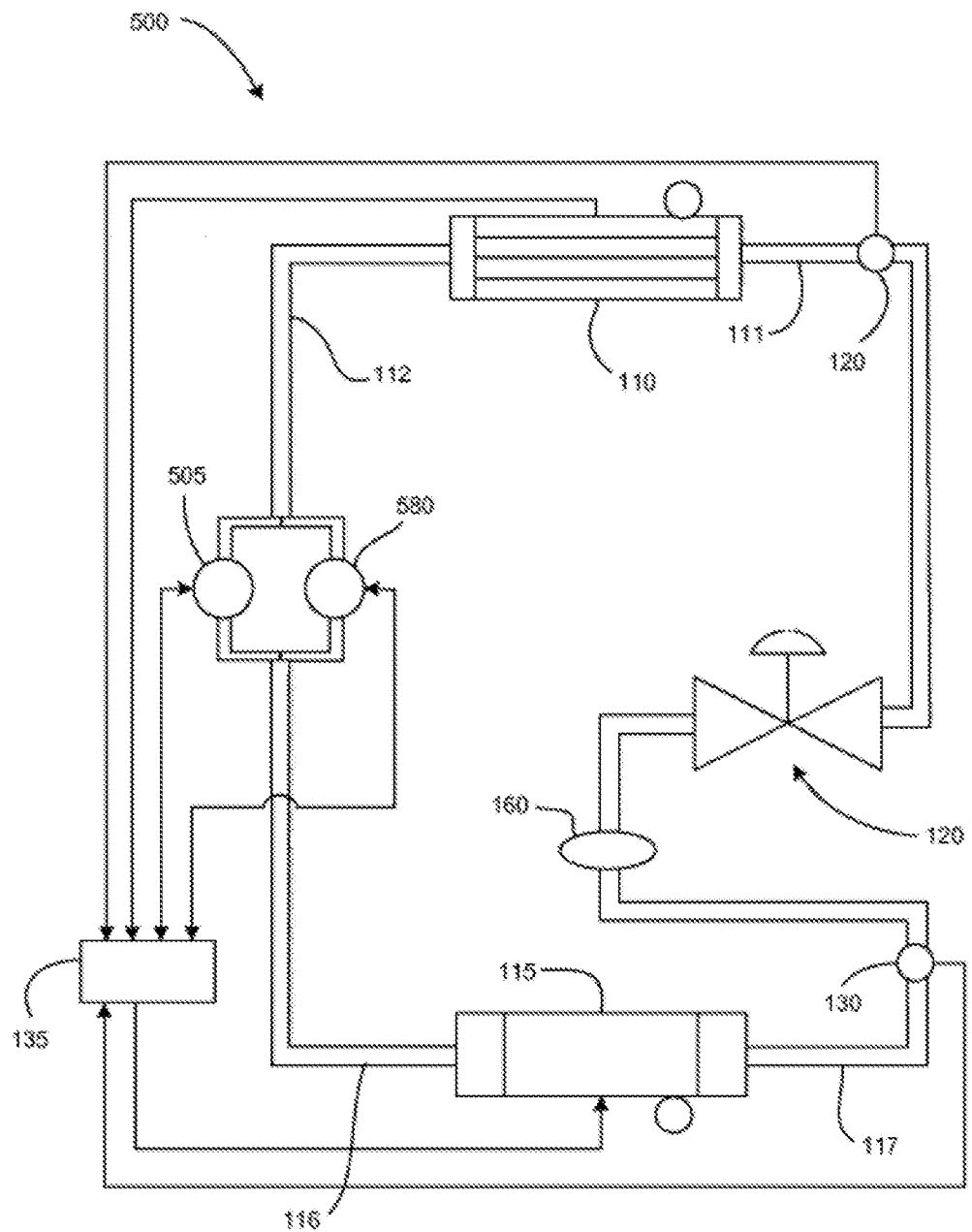
FIG. 8 is a block diagram of an exemplary refrigeration system that defines a closed loop that contains a working fluid and includes an electrochemical compressor and a mechanical compressor in parallel with each other.
Figure 9:
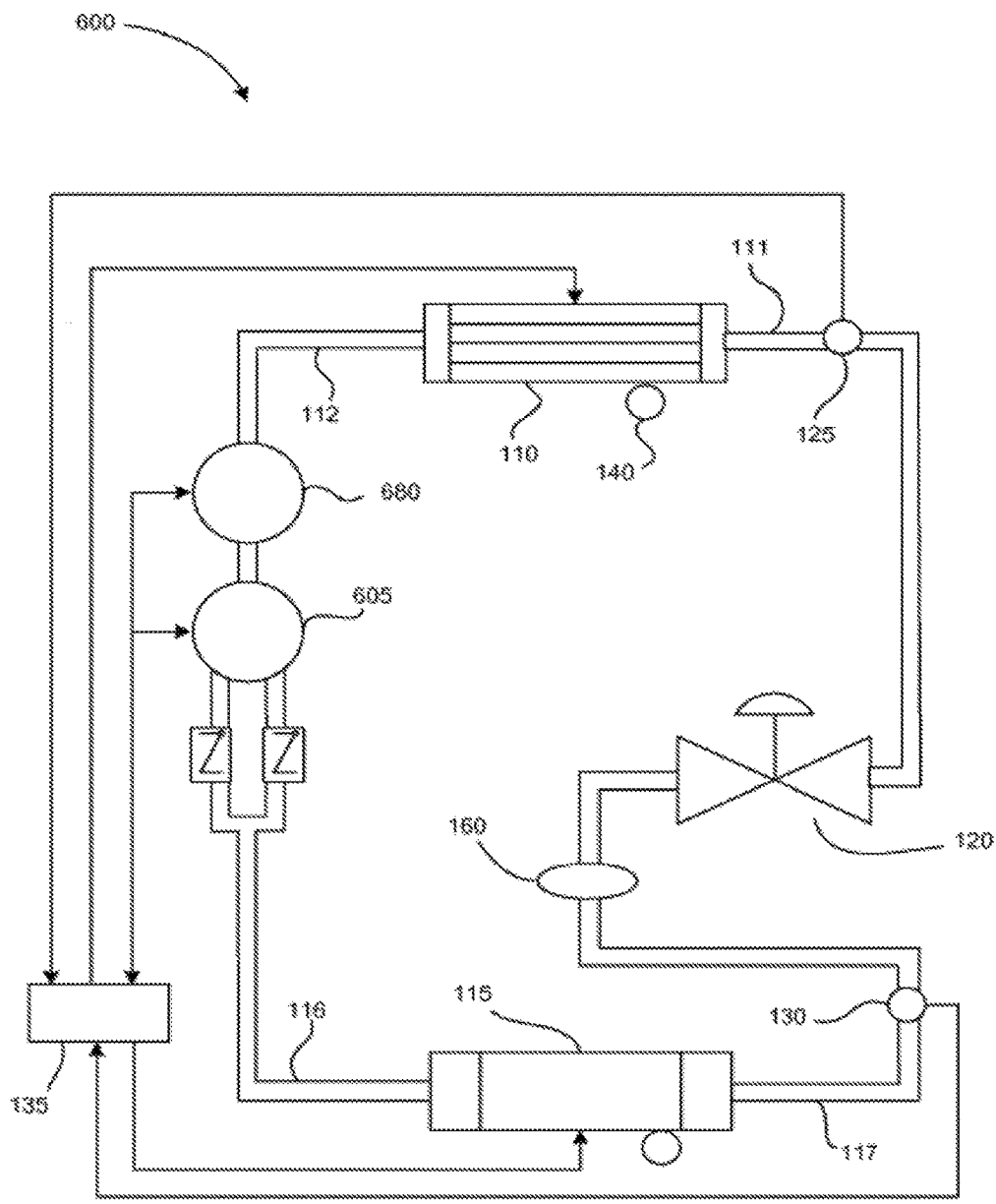
FIG. 9 is a block diagram of an exemplary refrigeration system that defines a closed loop that contains a working fluid and includes an electrochemical compressor and a mechanical compressor in series with each other.

Referring also to FIGS. 8 and 9, exemplary hybrid refrigeration systems 500, 600 define a closed loop that contains a working fluid and include the same components, for example, the electrochemical compressor, the heat transfer devices, and the thermostatic expansion valve, of the system 100. These systems 500, 600 also include mechanical compressors 580, 680 operating in conjunction with the electrochemical compressors 505, 605 in a hybrid fashion. Such a design is useful for use in electric vehicles, for example. The design of the systems 500, 600 provides high efficiency service at low refrigeration requirements and allows the mechanical segment of the system 500, 600 to take over at constant and higher refrigeration demands. The mechanical segment of the system 500, 600 is the segment that bypasses the electrochemical compressor 505, 605.

As shown in FIG. 8, the mechanical compressor 580 is in parallel with the electrochemical compressor 505. For simplicity, the one way valves, such as the valves 150, 155, and the separate conduits for the high pressure electrochemically active component and the condensable refrigerant, such as the conduits 152, 157, that are found at the output of the compressor 505 are omitted from this drawing. As shown in FIG. 6, the mechanical compressor 680 is in series with the electrochemical compressor 605.

The refrigeration system 100, 500, 600 can work with a wide range of condensable refrigerants. However, the choice of refrigerant depends on the exact application under consideration and other external regulatory factors. Care should be taken in the selection of the refrigerant to ensure that the refrigerant does not degrade the electrochemical performance of the system 100, 500, 600 or poison the electrocatalyst employed.

An ideal refrigerant has good thermodynamic properties, is noncorrosive, stable, and safe. The desired thermodynamic properties are at a boiling point somewhat below the target temperature, a high heat of vaporization, a moderate density in liquid form, a relatively high density in gaseous form, and a high critical temperature. Since boiling point and gas density are affected by pressure, refrigerants may be made more suitable for a particular application by choice of operating pressure.

Figure 10:
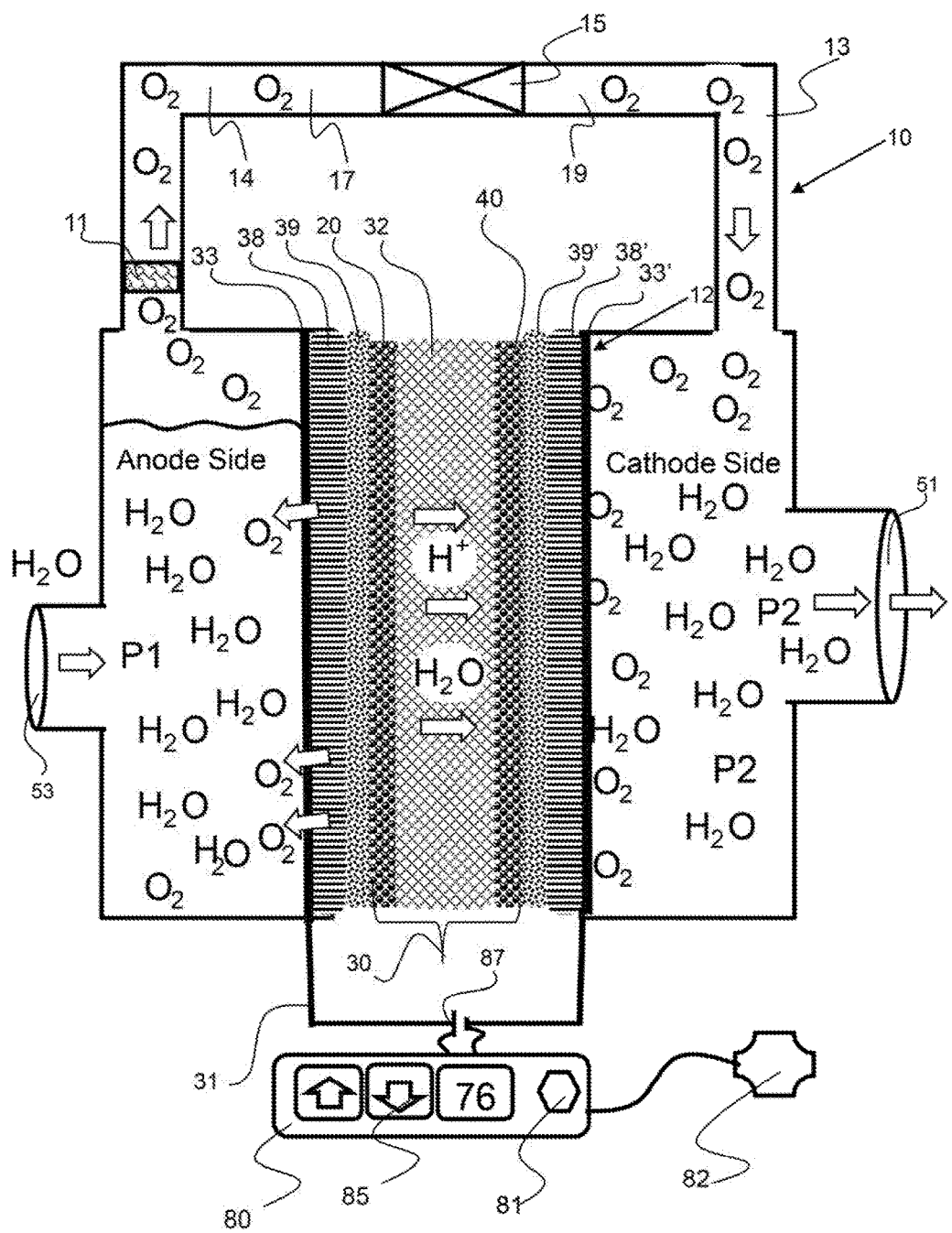
FIG. 10 shows a diagram of an electrochemical compressor having a venturi nozzle to transfer one of the decomposition products from the anode to the cathode.

As shown in FIG. 10, an electrochemical compressor 10 comprises an electrochemical cell 12 that reacts a working fluid, to produce decomposition products. The decomposition products include and ionic component, such as protons, and a reactant, such as oxygen. The protons pass through the ion conducting layer 32, or membrane and drag water along with it. The oxygen is transferred through the reactant conduit 13 that bypasses the electrochemical cell 12. An exemplary transfer device 15 configured along the reactant conduit and is configured to transfer the oxygen reactant to the cathode side where it reacts with the transported protons to reform water. The pressure on the cathode side, P2, is higher than the pressure on the anode side, P1, and the water produced on the cathode side may be passed through a refrigerant system, as described herein to produce work. The electrochemical cell comprises a membrane electrode assembly, MEA, 30 that reacts the working fluid and transfers an ion, such as a proton, across an ionic conducting layer, such as an ionomer, to the higher pressure side of the MEA, or in this case the cathode side. An exemplary MEA comprises a current collector 33, a flow field 38, and a gas diffusion media 39 on both the anode and cathode sides. In addition, the exemplary MEA comprises an anode 20 and a cathode 40 that comprises a catalyst to react with the working fluid and drive the flow of the working fluid. An ion conducting layer 32, such an ionomer transports the proton H+ from the anode to the cathode side and drags water along with it. A control system 80 having a microprocessor 81 may be used to control the voltage potential across the anode and cathode. A power source 87 may be coupled with a circuit 31 that is electrically coupled with the anode and the cathode, such as through the current collectors 33, 33' respectively. A user input may be used to set a flow or pressure and the controller may automatically change the voltage potential across the MEA to achieve and maintain the desired setting. A sensor 82 may be used to provide feedback to the controller of a system parameter, such as pressure, humidity, oxygen concentration and the like.

As shown in FIG. 10, a reactant conduit 13 extends from the anode to the cathode and has an anode or low pressure portion 17, upstream of the transfer device 15, and a cathode, or high pressure portion 19 downstream of the transfer device. The transfer device moves the reactant from the low pressure side to the higher pressure side of the electrochemical call and may be a one-way flow valve, a venturi nozzle, turbine, fan, pump or any other device that enables the transfer of the reactant from the anode, or low pressure, side of the electrochemical compressor to the cathode, or high pressure, side of the compressor. The control system 80 may control the operation of the transfer device 15, such as by pumping or opening the valve to allow the reactant to pass through the transfer device. The control system may run the system is cycles to allow the reactant to pass more easily from the anode to the cathode side, such as by reducing the pressure gradient and/or temporarily reversing it. The reactant as used herein is the byproduct of the electrochemical reaction on the anode, or low pressure, side that is not transported across the ion conducting layer. In the case of a MEA that utilizes an ionomer, water is reacted to form oxygen and protons. The protons are transferred through ionomer and the oxygen, the reactant, is transferred through the reactant conduit 13 to the cathode side.

As shown in FIG. 10, a reactant separator 11 is configured between the anode side and the transfer device within the reactant conduit. An exemplary reactant separator will preferentially allow the reactant to pass through while preventing the working fluid from passing through. An exemplary electrochemical compressor 10 may be configured with a reactant separator, or the reactant conduit may be open from the anode or low pressure side, to the transfer device 15. A reactant separator may be a film that has a high oxygen permeability, such as a polymer membrane or layer that preferentially transports oxygen. In addition, a reactant separator may comprise a fluid that has high oxygen or reactant solubility, such as perfluoroperhydrophenanthrene, which has a high solubility of oxygen. The concentration gradient from a reactant separator fluid to the reactant conduit may provide a flow of oxygen to the transfer device. The reactant separator may form a chamber for reactant between the reactant separator and the transfer device. This reactant chamber 14 may be much larger in volume than the reactant conduit. A plunger may be used to periodically increase the pressure on the anode portion of the reactant conduit to allow the reactant to be forced to the cathode portion of the reactant conduit. A control system may control the opening of a valve when the pressure in the reactant chamber exceeds that of the pressure on the cathode portion of the reactant conduit, thereby producing a flow of reactant to the cathode. The combination of a valve and compressing device is an example of a transfer device.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. An electrochemical compressor comprising:
an electrochemical cell comprising:
an anode that is gas pervious;
a cathode that is gas pervious;
an ion conducting layer disposed between and in intimate electrical contact with the cathode and the anode;
a power supply electrically connected to electrochemical cell to provide a voltage potential across the anode and cathode;
a reactant conduit that extends between and is in fluid communication with the anode and the cathode;
working fluid that reacted by the anode to produce a reactant and an ionic component;
wherein the ionic component is transferred through the ionic conducting layer from the anode to the cathode;
a transfer device configured along the reactant conduit to allow the transfer of the reactant from an anode portion of the reactant conduit to a cathode portion of the reactant conduit;
wherein the reactant is passed from the anode to the cathode through the reactant conduit;
an electrochemical compressor input for receiving said working fluid,
an electrochemical compressor output for expelling said working fluid,
wherein the reactant is reacted with the ionic component on the cathode to reform the working fluid.

2. The electrochemical compressor of claim 1, wherein the ionic component is cationic and the electrolyte is a cation conduction electrolyte.

3. The electrochemical compressor of claim 1 wherein the working fluid is water and the reactant component is oxygen and the ionic component is a proton.

4. The electrochemical compressor of claim 1 wherein the working fluid comprises methanol.

5. The electrochemical compressor of claim 1, wherein the working fluid comprises water and methanol.

6. The electrochemical compressor of claim 1, wherein the working fluid comprises ammonium hydroxide.

7. The electrochemical compressor of claim 1, wherein the transfer device is a venturi nozzle.

8. The electrochemical compressor of claim 7, further comprising a control system that controls the opening of the venturi nozzle.

9. The electrochemical compressor of claim 1, wherein the transfer device is a pump.

10. The electrochemical compressor of claim 9, further comprising a control system that controls operation of the pump.

11. The electrochemical compressor of claim 1, further comprising a reactant separator configured between the anode and the transfer device, wherein the reactant passed through the reactant separator into the anode portion of the reactant conduit.

12. The electrochemical compressor of claim 9, wherein the reactant separator is a reactant selective permeable layer.

13. The electrochemical compressor of claim 9, wherein the reactant separator comprises a reactant fluid, and wherein said reactant is soluble in said reactant fluid.

14. A refrigeration system that conveys heat from a first heat reservoir at a relatively low temperature to a second heat reservoir at relatively high temperature, the refrigeration system defining a closed loop that contains a working fluid, at least part of the working fluid being circulated through the closed loop, the refrigeration system comprising:

an electrochemical compressor as describe in claim 1.

15. The refrigeration system of claim 14, wherein the working fluid is water and the reactant oxygen and the ionic component is a proton.

16. The refrigeration system of claim 14, wherein the working fluid comprises methanol.

17. The refrigeration system of claim 14, wherein the working fluid comprises water and methanol.

18. The refrigeration system of claim 14, wherein the working fluid comprises ammonia.

19. The refrigeration system of claim 14, wherein the working fluid comprises ammonia and water.

* * * * *